UNITED STATES PATENT OFFICE.

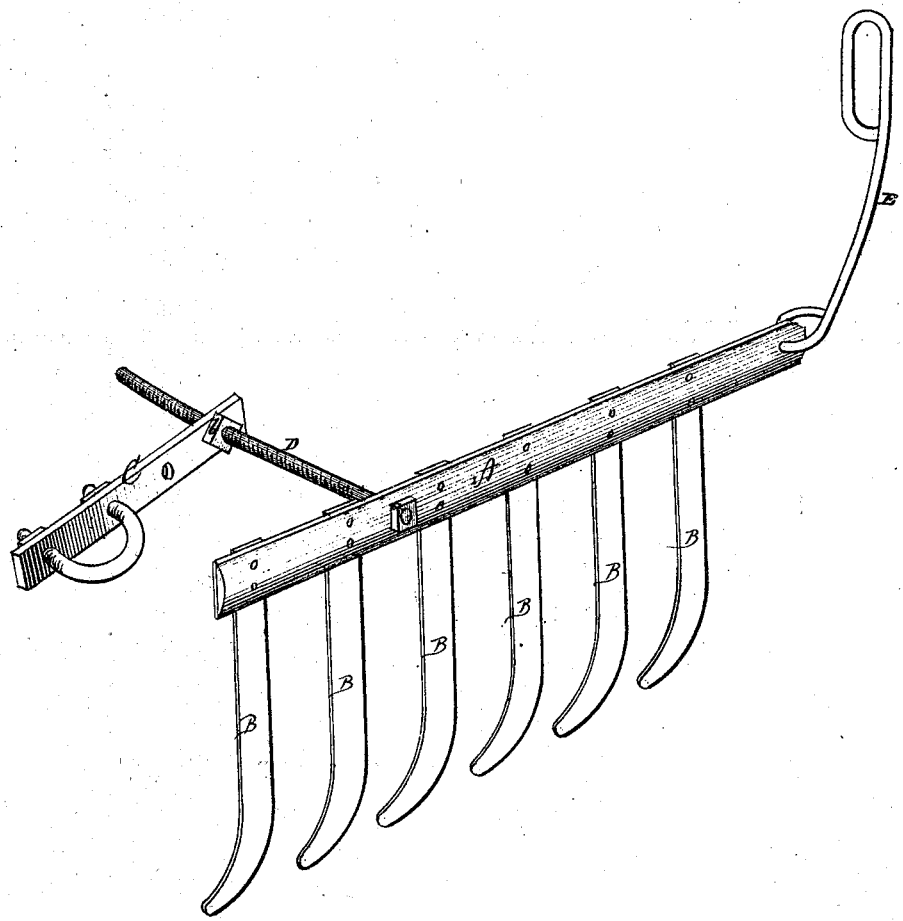

DAVID F. BROWN, OF CHAMPAIGN, ILLINOIS, AND ELIJAH C. BROWN, OF CRAWFORDSVILLE, INDIANA.

IMPROVEMENT IN SHIELDS FOR CORN-PLOWS.

Specification forming part of Letters Patent No. 95,079, dated September 21, 1869.

*To all whom it may concern:*

Be it known that we, DAVID F. BROWN, of Champaign, Champaign county, Illinois, and ELIJAH C. BROWN, of Crawfordsville, in the county of Montgomery, and in the State of Indiana, have invented certain new and useful Improvements in Shields for Corn-Plows; and we do hereby declare that the following is a full, clear, and exact description thereof, reference being had to the accompanying drawing, and to the letters of reference marked thereon, making a part of this specification.

The nature of our invention consists in the construction of a device to be attached to a corn-plow, by which the operator can run his plow close to the young plants without covering them up, and at the same time allow the fine earth to pass through the shield around the roots of the plants.

In order to enable others skilled in the art to which our invention appertains to make and use the same, we will now proceed to describe its construction and operation, referring to the annexed drawing, which represents a perspective view of our invention.

A represents a metal bar, of suitable length, width, and thickness, to which are attached six teeth, B B, in rake form, said teeth being made of light bar-iron, of suitable width and thickness, drawn or forged from the center to the point, and curved backward in line with the bar A, as seen in the drawing.

In order to use our device, we place a bar, C, on the back side of the plow-shank, one end of said bar being provided with two or more holes, and projects forward in line with the plow-beam. A screw-rod, D, is passed through a hole at a suitable point on the bar A, and secured near its end to the same by means of a tap or nut, *a*, on each side of said bar. The other end of the screw-rod D is then inserted in one of the holes on the projecting end of the bar C, and secured to the same by taps or burrs *b*—one on each side of said bar. The forward end of the bar A is then secured to the forward end of the plow-beam by means of a small rod or strap, E, of iron of suitable size. The taps or burrs *a b* on the screw-rod D may be run in or out, carrying the shield to any desired distance from the plow.

Having thus fully described our invention, what we claim as new, and desire to secure by Letters Patent, is—

1. The bar A, with rod E and teeth B B, when constructed as described, and used substantially in the manner and for the purposes set forth.

2. The arrangement of the bar C, screw-rod D, and taps or nuts *a b*, substantially as and for the purposes herein set forth.

3. The combination of the bar A, teeth B B, bar C, screw-rod D, taps *a b*, and rod E, all substantially as and for the purposes herein set forth.

In testimony that we claim the foregoing we have hereunto set our hands this 29th day of June, 1869.

DAVID F. BROWN.
ELIJAH C. BROWN.

Witnesses:
A. D. EADS,
A. THOMSON.